United States Patent [19]
Ahamed et al.

[11] Patent Number: 5,628,011
[45] Date of Patent: May 6, 1997

[54] NETWORK-BASED INTELLIGENT INFORMATION-SOURCING ARRANGEMENT

[75] Inventors: Syed V. Ahamed, Somerset; Victor B. Lawrence, Holmdel, both of N.J.

[73] Assignee: AT&T, Middletown, N.J.

[21] Appl. No.: 421

[22] Filed: Jan. 4, 1993

[51] Int. Cl.⁶ .................................................. G06F 17/30
[52] U.S. Cl. ............... 395/610; 395/605; 395/200.03; 395/10; 395/11; 395/52; 395/54; 395/76
[58] Field of Search ........................ 395/600, 375, 395/60–61, 54, 11, 12, 63, 200.03, 10, 52, 76; 364/419, 242, 284

[56] References Cited

U.S. PATENT DOCUMENTS

| | | | |
|---|---|---|---|
| 5,241,671 | 8/1993 | Reed et al. | 395/600 |
| 5,265,065 | 11/1993 | Turtle | 395/600 |
| 5,408,619 | 4/1995 | Oran | 395/325 |
| 5,434,974 | 7/1995 | Loucks et al. | 395/200 |

OTHER PUBLICATIONS

"Merging Expert Systems and Databases" by Benjamin Cohen, AI Expert, v4, n2, p. 22(8) Feb. 1989.

"Toward a document base management system" by Effy Oz, Information Executive, v3, n1, p. 19(5) Dec. 1990.

*Primary Examiner*—Thomas G. Black
*Assistant Examiner*—Hosain T. Alam

[57] ABSTRACT

A network-based intelligent information-sourcing system has capabilities akin to an automated universal teacher, researcher, or expert, in that the system is able to interpret, both independently and in context, and provide comprehensive answers to received queries on substantially any subject. This capability is achieved by enhancing existing telecommunications networks and intelligent networks to incorporate a knowledge-processing capability. This network uses the communication capability of the network to collect queries from, e.g., students in an interactive mode, then passes the question to a "knowledge ring" which comprises numerous knowledge bases arranged hierarchically, and then sends the response back from an "artificially intelligent instructor". Once the query is understood, the system restates the question back to the student in the way the particular knowledge base is integrated. Upon confirmation, the system delivers the response back to the student.

14 Claims, 6 Drawing Sheets

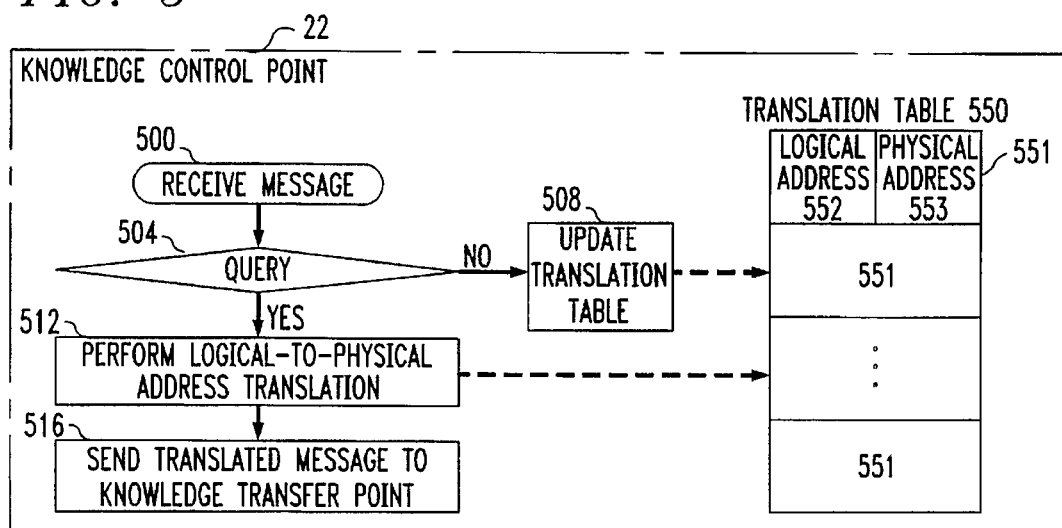
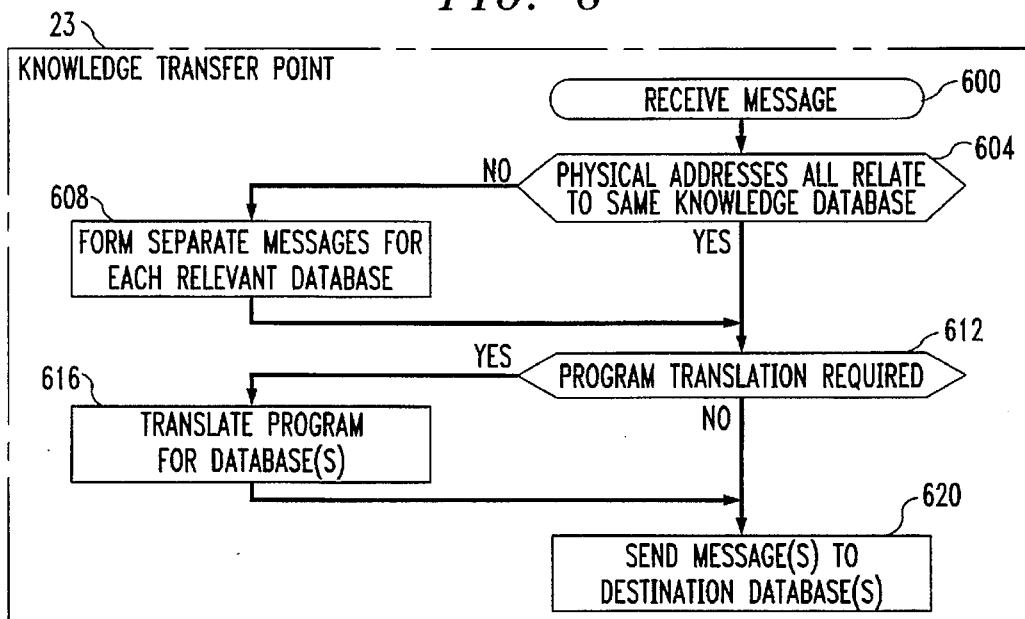
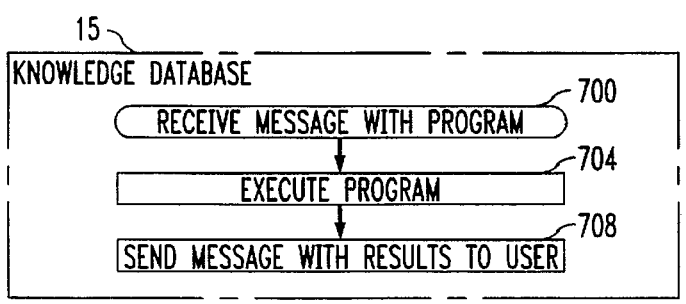

NETWORK-BASED INTELLIGENT INFORMATION-SOURCING ARRANGEMENT

TECHNICAL FIELD

This invention is related to telecommunications, particularly to intelligent networks, and to knowledge engineering.

BACKGROUND OF THE INVENTION

Since the advent of stored-program control, telecommunications networks have been expanding their capabilities and functionality to provide a rich, varied, and flexible menu of telecommunications features and services. In the recent past, this evolution has culminated in the development of the Intelligent Network/2 (IN/2). The IN/2 architecture concept diverges from the traditional new service introduction approach by distributing call-processing capabilities across multiple network modules, by constructing network services with service-independent capabilities, and by using standard signaling protocols among network elements. A thorough overview of intelligent networks is presented in *IEEE Communications Magazine*, Vol. 26, No. 12 (December 1988) and Vol. 31, No. 2 (February 1992); these issues are dedicated to this subject.

With the evolution of the telecommunications networks and their capabilities have come network-based information-retrieval services which provide on-line, real-time access to information stored in electronic databases. Examples of these are the Dialog® and Lexis/Nexis® services and university campus library-access systems. Recently, even more sophisticated network-based educational systems have started to emerge, which facilitate distance learning, interactive distance classrooms, and video-based participation of distant classrooms. Illustrative examples of such systems are proposed and described in F. B. Brown, "A Primer on Telecommunication in Distance Learing", *Proceedings of the Pacific Telecommunications Council* (Jan. 12–15, 1992), paper no. 2.3.6.1; and P. L. Taylor, "The Global Classroom: A Telecommunications Event for Educators", id., paper no. 2.3.6.2. Nevertheless, all these services and systems have a common shortcoming in that they are essentially passive retrievers and transporters of precisely-specified information, and hence require a high degree of a-priori knowledge and sophistication from their users. The knowledge and sophistication are necessary for the proper formulation of information requests and resultant information searches. In essence, the user must know precisely what information he or she needs, where to find it, and how to ask for it.

The field of artificial intelligence includes among its considerations the representation of knowledge in machine-understandable form, known as knowledge engineering. Excellent overviews of the artificial intelligence field, including of knowledge engineering, are presented by Elaine Rich in *Artificial Intelligence*, McGraw-Hill Book Co. (1983), and by Edward A. Feigenbaum et al. (eds.) in *The Handbook of Artificial Intelligence*, Vols. 1–3, Heuris Tech Press/Wm. Kaufmann, Inc. (1981, 1982). Although artificial intelligence has been successfully applied in the field of education, to computer-assisted instruction, little or no work has been done in applying the lessons and techniques of artificial intelligence in general, and of knowledge engineering in particular, to the network-based information-retrieval services.

SUMMARY OF THE INVENTION

The invention is directed to overcoming these and other problems and disadvantages of the prior art. Illustratively according to the invention, there is provided a network-based intelligent information-sourcing system that has capabilities akin to an automated universal teacher, researcher, or expert, in that the system is able to interpret—both independently and in context—and provide comprehensive answers to, received queries on substantially any subject. This capability is achieved by enhancing existing telecommunications networks and intelligent networks to incorporate a knowledge-processing capability. This type of network processes knowledge and its segments intelligently and fabricates the response from a large cross-section of knowledge bases (data banks). This network uses the communication capability of the network to collect queries from, e.g., students in an interactive mode, then poses the question to a "knowledge ring" which comprises numerous knowledge bases arranged hierarchically, and then sends the response back from an "artificially intelligent instructor". Such a response is consistent with the response of an extremely knowledgeable instructor, but one needing streamlined language interface to comprehend the precise needs of the student. Once the query is understood, the system restates the question back to the student in the way the particular knowledge base is integrated. Upon confirmation, the system delivers the response back to the student. Processing of knowledge occurs as information flows through the network in two distinct ways. First, when the initial interrogation takes place, the subject matter is identified and linked to other knowledge by forward and backward chaining. Second, the function to be performed on this subject matter is also identified and an operator-operand relationship is established to facilitate the network response. A compiler parses all transactions initiated by the students into a code of operations that need to be performed upon the subject matter. By this intermediate step, complex interrogations are assembled as a series of program steps which the network interprets or executes like any other computer system.

Specifically according to the invention, there is provided a network and an automated method of responding to a query in the network. The network includes one or more subject repositories, such as knowledge databases, and a subject-matter dictionary that lists subjects that are available in the repositories, their logical addresses, and operations permitted in the network with respect to the available subjects. In response to receiving in the network a query from a requester, the query is parsed to identify a subject of the query and an operation to be performed with respect to the subject, and the dictionary is used to determine whether the identified subject is available in the network and whether the identified operation is permitted with respect to the identified subject. In response to a determination that the identified subject is available and the identified operation is permitted, the query is compiled into an executable program which includes the logical address of the identified subject. The logical address in the program is translated into a physical address of the identified subject, and the physical address is used to select a repository that contains the identified subject. The program is then transmitted to the selected repository for execution, is executed there to obtain a result, i.e., a response to the query, and the obtained result is transmitted to the requester.

Preferably, the network is capable of responding not only with the subject that is identified in the query, but also with a related subject. For example, in the case of knowledge, the related knowledge may be one or more of the following: supplementary knowledge, complementary knowledge, inductive knowledge, and analogical knowledge. The network includes a subject tree that defines relationships between the available subjects, for example via forward and backward chaining of the available subject, and the logical address of the identified subject is used to find a subject related to the identified subject in the subject tree. The program is then supplemented with the related subject and its logical address. Logical-to-physical address translation is performed on the logical addresses of both the identified subject and the related subject. These physical addresses are used to select at least one repository that contains the identified and the related subjects, the program is sent to the selected repositories and is executed at each of the selected repositories to obtain there at least one response, e.g., at least a portion of a complete response, to the query, and the at least one response is transmitted to the requester.

The arrangement has numerous advantages over the present state of the art. From the users' perspective, the only sophistication that it requires from users is the ability to ask questions. It is therefore easily usable by virtually anyone. Because it provides network-wide (e.g., global) access to knowledge, it avoids the need for conventional repositories of knowledge (e.g., books) and their replication in many locations (e.g., libraries). Because it makes long-distance and multi-site access to knowledge possible, it speeds up, simplifies, and facilitates access to the knowledge, and streamlines the provisioning of the responses. These advantages on balance make the arrangement a much more economically efficient, cheaper, way of disseminating knowledge than traditional schemes.

Furthermore, in its capacity to find and provide not only direct responses to queries but also related information, the arrangement can provide suggestions to the user for further learning, further topics to explore, thereby increasing the sophistication of the knowledge provided and challenging the user's understanding and curiousity. Over time, the arrangement can build up a profile of individual users, and on that basis increase the sophistication of query responses supplemented with related information. The arrangement can thus pace the users based upon their individual learning ability, and allow the users to proceed in learning each at his or her own pace. The arrangement can thereby assume the role of an individualized tutor or instructor.

From a technical perspective, the arrangement is implementable in stages, and is extremely flexible in that it can be built on as small, local, a scale or as large, global, a scale as desired. Processing capacity of the network is easily expanded merely by adding more processing nodes to the network. The arrangement does not require unusual communications schemes but may be implemented using conventional communications systems and protocols, such as those of the emerging intelligent networks. The arrangement is simple in its communications scheme, relying on unidirectional, circular, as opposed to bidirectional, duplex, communication pathways. For example, queries flow from users via narrowband media, and responses return via wideband media. Errors in the exchange of information can be easily and automatically identified and localized, without being propagated through the network. New knowledge can be added to the arrangement incrementally by adding new information to existing databases or by connecting new databases to the network. Human involvement in the process is limited to the original provisioning of knowledge and thereafter to posing queries, thereby greatly reducing the possibility for human error.

These and other advantages and features of the invention will become apparent from the following description of an illustrative embodiment of the invention taken together with the drawing.

BRIEF DESCRIPTION OF THE DRAWING

FIG. 5 is a functional flow diagram of the knowledge control point of the network of FIG. 1;

FIG. 6 is a functional flow diagram of the knowledge transfer point of the network of FIG. 1;

FIG. 7 is a functional flow diagram of a knowledge database of the network of FIG. 1.

DETAILED DESCRIPTION

Figure 1:
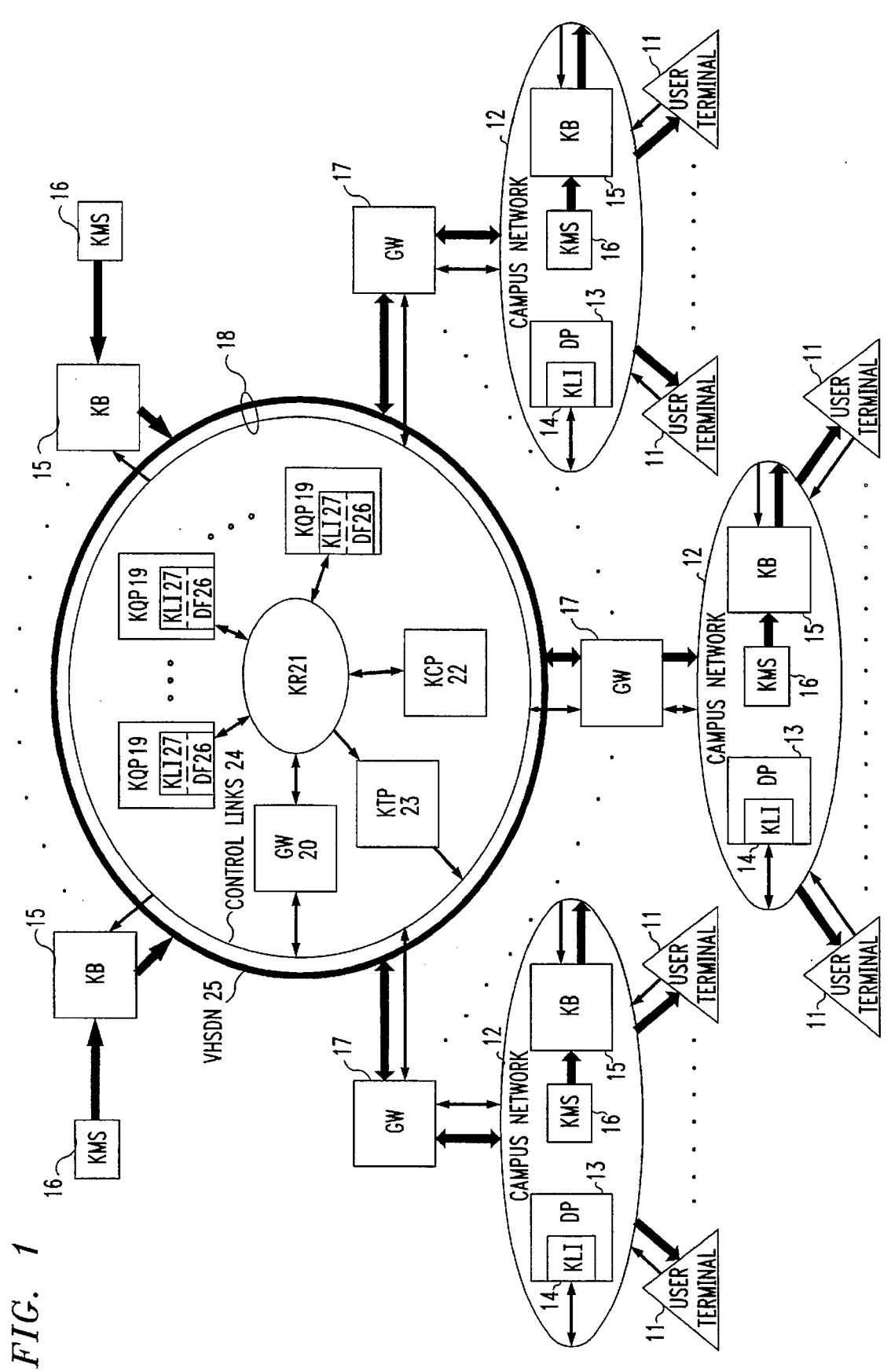
FIG. 1 is a block diagram of the architecture of a network-based educational system that includes an illustrative embodiment of the invention.

Described below is an architectural configuration of an illustrative network-based educational system (NBES) of FIG. 1 and of its components, which have the advantages and features of an intelligent network. Described are the areas where this network differs from conventional intelligent networks, such as the need for syntactic rule-based "knowledge processing", and the need for a "knowledge-control point" rather than a service-control point of the conventional intelligent network.

Features Common to Educational Environments

In the exchange of information and knowledge which has been an age-old proposition in schools and universities, the discipline of communication is at work. The impact of the relatively new field of data communications upon the oldest institution of the teacher-student relationship is very likely to cause resistance and friction. Be as it may, if the two are going to be merged, then knowledge bases need to be installed, interfaces need to be designed, and the learning steps need to be compiled in processing increments of information which can be collated, sorted, merged, rearranged, graphed, and evolved as a body of knowledge which will be retained in the minds of the learners. Thus, knowledge engineering is the concern of every teacher and of every student.

Fortunately, computer science has streamlined some of these basic functions in all exchanges of information and data. More important is the man-machine communication via a structured language which can be parsed, analyzed based upon the rules of syntax, and analyzed based upon the rules of semantics. Then—if the entire module of communication (i.e., a program) is consistent—the process of assembly and linking can be started to generate executable codes which a program-controlled machine simply executes as an independent module or as binary machine instructions.

Flexibility of language facilitates communications enormously. If a fault-tolerant super-compiler can be instituted at every man-machine interface, then any student can talk to the machine and any machine can become an understanding teacher. But the installation of fault-tolerant super-compilers is an outrageously expensive proposition. However, the student can go half-way and work instead with a realistic interface and an inexpensive computer.

Role of Networks in Educational Environments

Ideally, an instructor is able to answer any query on any subject instantly, and provides a platform for an interactive hierarchy of knowledge. Since the instructor is presently at least partially human, students learn to compromise. If the logical and the retrieval parts of the instructor function can be automated, then the source of information can be in distant knowledge banks, and the role of the network is to communicate information over long distances. In this mechanized environment as it is typically envisioned, creativity of the instructor to foresee implications—the forward vision—and the integration of concepts still remains human. But the capacity to store, monitor, and retrieve information over long distances brings memory technology and communication engineering within the realm of the teacher-student relationship.

When the role of networks is only to gap the physical distance between teacher and student via video and audio channels, distance learning ensues. In addition, when the role of networks becomes intelligent and human-like in processing and controlling the information communicated, the features of an intelligent network ensue. When the role of the network further includes the processing of knowledge by dissecting (parsing) and reforming the syntactic and semantic context of the network queries to assemble a logical response from distributed knowledge bases, then a network-based education system (NBES) emerges. Such a system is shown in FIG. 1.

Role of Knowledge Bases in Educational Environments

Mechanized storage and retrieval of information offers well-documented and distinct advantages to the educational community. We shall not reiterate these benefits; instead, we will discuss the management and updating of such vast electronic devices that serve the interests of the teaching community. It is presumed and accepted that knowledge is dynamic, quantifiable, and classifiable. Consequently, knowledge bases need to be maintained, stored in discrete blocks at finite addresses, and separated out by the relationship which any finite quantity (e.g. a paper by its title, keywords, etc.; a book by its title, chapters, references, etc; a concept by its origin, its use, its application, etc.) of knowledge has with respect to prior knowledge about the subject (whose address is known or accessible to software-implemented knowledge-bank managers).

In conjunction with the proposed NBES, knowledge bases need to be addressed by subject, and need to be maintained and managed by experts in the field. This concept has been well-recognized in the telecommunications, credit-card, car-rental, etc., industries, and trained staff have been emplaced to maintain such databases. In the context of the intelligent networks, the service management system is viewed as an essential element to maintain, monitor, update, and optimize the service control point (SCP), which is itself a large network database.

Architecture of the NBES

Building Blocks

Campus Networks (CNs) 12: As shown in FIG. 1, NBES is network-based. It includes and interconnects numerous campus networks 12 each one of which serves a plurality of user terminals 11, analogously to how metropolitan-area networks (MANs) and wide-area networks (WANs) interconnect local-area networks (LANs). Gateways (GW) 17 in campus networks 12 in cooperation with a remote gateway 20 monitor and direct the flow of control communications out of the campus networks 12 to nodes of a knowledge ring 21—which is another network—via control communications links 24, e.g., ISDN D channels, illustratively provided by a public network 18. The outflow of queries from user terminals 11 that cannot be handled within the local campus network flows up to knowledge ring 21, and specifically-compiled information in response to the queries is received in campus networks 12.

Dialog Processor (DP) 13 and Knowledge Logic Interpreter (KLI) 14: Within the confines of each campus network, the validity of a request for service and the operation code (query/command) and operands (hierarchical number, e.g., Dewey decimal number, of the subject matter) of a query are both identified and validated, by a dialog processor (DP) 13. A knowledge logic interface (KLI) function 14 within the dialog processor 13 is instrumental in formulating and in dispatching an executable binary language instruction (in any appropriate format or protocol) to the network components. The network components carry out their respective functions (as they are performed during call-processing in traditional telecommunications networks) to send the answer back to the initiator of the query. The information sought is extracted from a knowledge database 15, and this information is sent in a burst (e.g., a packet) from knowledge database 15 to the user's terminal 11. At this stage, any conventional network protocol may be used.

Very High Speed Data Network (VHSDN) 25: Classic circuit-switched telephone-type networks are bidirectional, generally with the same data rates in both directions. These are likely to become saturated (especially during peak traffic hours) with the high volume of personalized data traffic in the NBES. However, evolving very high-speed data networks (VHSDNs) 25 dedicated to the transport of large blocks of data offer enormous promise. Examples thereof include the fast-packet networks and SONET and ATM networks. Student queries need initial processing to remove inaccuracy of the language or uncertainty of the questions posed. But when the formation of the query is complete, a knowledge database 15 is accessed by a packet sent via control communication links 24 (an equivalent to the CSS-7 network for intelligent networks, which controls and facilitates new services and controls circuit-switched channels within service switching points of the intelligent network). The knowledge database 15 now can transmit large blocks of customized data in response to the solicitation/command, via VHSDN 25 that links knowledge databases 15 through gateways 17 to the various campus networks 12. It is interesting to note that the normal flow of information becomes unidirectional in NBES, as opposed to the bidirectional flow of control information in conventional intelligent networks. Bandwidth allocation can thus be made optimal in NBES.

Knowledge databases (KBs) 15: If the information contained in knowledge databases 15 is highly specialized, up-to-date, and at the state of technology, then a large number of the knowledge databases may become essential. These may be networked or independent. In any case, an individual knowledge maintenance system 16 for every knowledge database 15 is likely to be necessary. Small and independent dynamic databases, such as a stock-market database, an airline database, or even a patient database, exist and can be suitably utilized to store modules of knowledge (e.g., papers, equations, technologies, etc.) in variable-length data structures to function as knowledge bases 15. Ample literature exists about the existence and fabrication of such databases and will not be discussed any further herein.

Knowledge Management System (KMS) 16: Knowledge has vague frontiers and it is actively modified, processed, and expanded. For this reason, the updating of knowledge bases 15 is crucial. Hence, a group of experts to update and modify such a knowledge base is essential. This functionality is human in most organizations, libraries, or even computer systems. Operating systems techniques may sometimes be used to retain the most-recently-used variable/file, most-frequently-used variable/file, nearest-context variable/file, etc. (in the same manner as they are used in memory and cache-management systems). However implemented, the functionality of knowledge management systems 16 in NBES is necessary. Presently, we foresee these knowledge management systems 16 to be staffed by human beings rather than as being self-renovating information systems. For a network of knowledge databases 15, one knowledge management system 16 with numerous specialists for each knowledge database 15 with one common interface may be sufficient, and perhaps more economical. The size of the particular knowledge database 15 and the dynamic nature of stored information will influence this choice.

There is another side to knowledge databases 15 and knowledge management systems 16. When the loci of active knowledge-generation (such as research laboratories, satellite tracking stations, think tanks, etc.,) are networked to feed knowledge databases 15 directly, then the updating can be automatic. Examples of such automated environments exist: a stock market transaction is automatically entered in a stock market database; weather satellites automatically update meteorological centers; defense radar trackers automatically warn national defense networks, etc. In a paperless society, we can foresee the sources of knowledge as being in direct communication with the consumers of knowledge via the NBES environments. Checkpoints are seen as being essential to the entry of only authenticated and authorized information in knowledge databases 15.

Knowledge Ring (KR) 21: Isolated knowledge databases 15 can become too expensive to dispense specialized modules of information. Conversely, very widely-documented subjects may need multi-terabytes of storage space. To contain and manage the storage of very vast bases or very tiny bases, a knowledge ring 21 provides a viable compromise. This ring, capable of storing information about numerous databases 15 in its nodes, referred to as knowledge query points 19, caters to growing knowledge and new areas of research by adding nodes 19 on the ring. New nodes 19 may also be added to this ring as new disciplines emerge and evolve. Conversely, old nodes 19 may be deleted, when it is no longer necessary to retain obsolete databases 15 or when particular databases 15 are no longer economically viable to sustain. The access and cost of access may then be controlled by software and protocols in the same manner as they are presently used to access long-distance and trunk facilities of any communications system.

Knowledge ring 21 is any suitable communications medium, such as the FDDI, Bellcore's SMDS, or AT&T's StarLAN. An optimum medium will have a communications protocol specifically designed for the NBES so that relevant information can be conveyed in message headers and not only in the message's data fields.

If knowledge ring 21 is itself designed as a network, then addressable databases 15 can be assigned logical addresses to correspond to the high-level hierarchical numbering classification of, e.g., the Dewey decimal system or the Library of Congress classification of the subject matters. This approach permits the designers of the NBES to build an electronic library of any size, of any expertise, and as easily composed as a physical library, by changing the contents of the data structures in knowledge databases 15 which are addressed logically through nodes 19 on knowledge ring 21.

Knowledge Query Points (KQPs) 19: These are computer and software-implemented interfaces between NBES and campus networks 12. In order for the NBES to perform intelligent functions in responding to queries from campus networks 12, an interpretive interface is necessary to accept structured queries and infer which knowledge database 15 to address in order to generate a response. In conventional intelligent networks, the network response in initiated when the service switching point (SSP) detects a trigger condition (i.e., the dialing of an 800, 911, or 700 number, etc.) from the subscriber. The functionality of knowledge query points 19 is critical to the success of this network environment. Knowledge query points 19 accomplish the function of a pre-processor. They are a checkpoint of legitimate users and their transactions—in the form of questions/retrieval—that may be initiated through the network. In a sense, this is a software equivalent of the physical door placed at money-access center (MAC) systems. At the entry to the network, dialog formatter 26 of a knowledge query point 19 performs validation functions: student validation, authorization-code validation, access-authorization validation, billing information collection, and credit-card information collection, for the service provided. Transactions of illegal users, hackers, and virus-planters are detected and terminated at this level by the network. Unauthorized users of the particular subject matter, sneakers, browsers, and accidental information leaks, etc., are expelled for reasons of network security.

A second part of the software that processes queries at the knowledge query points 19 acts as a second check before any transaction with the network takes place. It identifies the subject matter via a modified English-language dictionary. Valid dictionary words (including proper names of people, places, materials, objects, about whom information exists in the knowledge databases 3.5) are checked to see if they belong to the classification of knowledge stored in knowledge ring 21. Misspelled words, nonsense subject matter, and improper queries in the context of the subject matter, are returned to the users.

A third software barrier at a KQP 19 performs a query processing function which identifies what is asked about which subject matter. The parser in knowledge logic interpreter 27 of a KQP 19 separates the solicitation and/or command from the subject matter in the query. The solicitation can be in the form of what, how, who, why, when, etc., or combinations thereof, about the particular subject matter in the query. The command can be in the form of lookup, retrieve, expand, instances, analogize, etc., the subject matter. Every query and/or command is an operation code with its customized protocol. And every subject matter can be viewed as an operand. Together they form an NBES network instruction. A transaction can be a single instruction or an assembly of such instructions depending upon what the user wishes to accomplish. This assembly is then executed or interpreted by the network. Every instruction accomplishes a finite step in "knowledge processing" in the network.

Knowledge Logic Interpreter (KLI) 27 in knowledge query points 19: In a sense, a knowledge logic interpreter 27 identifies the subject matter in the context of the structure of the overall knowledge, by identifying the "generalized knowledge address" (the Dewey Decimal number, the Library of Congress identifier, etc.) of the subject matter sought.

A modified dictionary identifies the subjects—the knowledge—categorized within nodes 19 of knowledge ring 21. The subject matter is itself classified and catalogued according to a subject numbering hierarchy such as the Dewey Decimal System, the Library of Congress system, the Asian Library system, or even the Princeton classification system. The two syntactical components of the user's query are reconstructed here. Only if the network can handle the interrogation from the campus network 12 will the syntactical components of the query be allowed to proceed in the network. This procedure is similar to the operating-system procedure of any computer system which does not permit the execution phase of a program if fatal errors were found in the program's compilation.

Knowledge Control Point (KCP) 22: This element converts a "knowledge address identifier" to the actual physical or logical address of the locations in knowledge databases 15 where that knowledge is embedded. The knowledge address in any of the knowledge classification systems (such as the Dewey, Library of Congress, etc.) is converted to a network address of the knowledge database 15. It is necessary for this address translation to be hierarchical, i.e., the first segment of the address alone identifies the knowledge database 15, and the latter segment or segments actually locate the exact track-sector address of the mass storage system. The near future holds the possibility of building massive RAMs which have memory addresses to correspond to the knowledge address of the subject matter, thus reducing the time for address translation further.

The Knowledge Transfer Point CKTP) 23: All of the specific operations (i.e., what is to be done), to which operands (i.e., which subject matter), and their logical and their physical address, are made available by knowledge control point 22 to knowledge transfer point 23. This computer- and software-implemented element acts as a server between the completely-complied commands from knowledge control point 22 and knowledge databases 15 which actually hold the information. Knowledge transfer point 23 converts these commands to knowledge database control packets, and dispatches the packets via the signaling or the "back-bone" network 18. Whenever a packet arrives in its right sequence, the interrogated knowledge database 15 responds by bursting the required information to the user via very high-speed digital network 25 and a gateway 17 to the querying campus network 12 and its appropriate user terminal 11. At this stage, the conventional CCITT X.25, BX.25, or any other suitable network protocol may be implemented. Any individual variations in the implementation of the various databases' software can be handled at knowledge transfer point 23 as it directs its command packets to individual databases 15.

KCP-KR Protocol: Wherever the physical or logical address of the actual knowledge (the subject matter) may be located, the command (i.e., opcode) for that piece of knowledge has to be communicated to the knowledge database 15 where that subject matter has been located. This network instruction is received at the knowledge database 15 and is executed there in its entirety. The protocol can be in the form of operation codes, or it can be further condensed to make the best use of the network transmission and protocol processing facilities. If knowledge databases 15 each have central processing units that function on standard microcode, then knowledge control point 22 needs to communicate the address of the microprogram into the control memory of the CPU. Typically, the complex queries will have more than one "instruction" to the network.

NBES Network Protocol: This protocol preferably has its network functions distinct from both the common-channel interoffice-signaling system (CCISS) protocol and the open system interconnect (OSI) communications protocol. The functions of the NBES cannot be elegantly mapped into the functions of either the CCISS or the OSI environment. The functions of NBES also cannot be assembled as a superset from the functions of both CCISS and OSI subfunctions. However, they can be conveyed in the user data field of any one of these protocols, albeit at a sacrifice of efficiency. Consequently, an efficient and unique protocol for NBES is likely to evolve over time in its own right, as any other protocol. But this should not cause a major problem to initial implementations, since the evolution of NBES is still embryonic.

Existing Platform for NBES: There is some analogy between the functions and components of the conventional intelligent networks (such as IN/2, USIN, etc.) and those of the NBES. But forcing NBES functions from IN/2 architecture is suboptimal. The concept of recognizing the structure of knowledge and then being able to compose a response from the network offers some distinct advantages. Properly-designed NBES can eventually combine all the advantages that distance-learning and mass-media systems have to offer. For these reasons, the implementation of the NBES can be seen as an enhancement of the implementation of the conventional intelligent networks.

Intelligent (AI) Functions of NBES

KQPs 19 have an ability to relate subjects in an organized structure via forward and backward pointers that define relationships between the subjects, and thereby chain them together. In knowledge engineering, this structure is known as a knowledge tree. Through this ability, KQPs 19 provide intelligent functions relative to queried-for knowledge, as described below.

Supplementary Knowledge:

When a KQP 19 has executed a series of transactions for any user (e.g., a student), it has information about the user's line of inquiry and how the network was queried. Since the information sought by the student follows a certain pattern of interrogation, the network can detect which aspects of the subject matter the student is ill-informed on, and can recommend or initiate further instructions to the KB to furnish "readings" akin to the reading lists that a human instructor provides. The pattern of pursuit of knowledge is used to determine the lack of expertise of the interrogator. This function is based upon the sequence of queries flowing through KQP 19.

Complementary Knowledge:

When KQP 19 has caught on to a line of interrogation, the possible ultimate goal(s) of the participant can be extrapolated (from the knowledge tree or hierarchy). This gives NBES the capability of being exhaustive about all outcomes, as opposed to the limited search that humans make. The knowledge processing of the network is thus intertwined with the creativity of the participant. In knowledge engineering, forward chaining permits a much-wider routine knowledge search than what the mind can perform routinely. The network acts as a powerful complement rather than a challenge to human creativity.

Inductive Knowledge:

KQP 19 can also detect the relationships between the queries, i.e., detect the forward chaining and backward chaining (carded out routinely in knowledge engineering) of the subject matter pursued, and lead the student to areas known in literature (and embedded in knowledge bases) which the student may not know of. In a sense, the network now becomes an "artificially intelligent instructor", identifying and detecting the cause-and-effect relationships between the subjects being pursued, and indicate other causes or other effects related to the same event/subject matter.

Analogical Knowledge:

When a researcher uses a chain of interrelationships in what he or she is pursuing, KQP 19 is able to detect other disciplines or situations in which such relationships exist. Supposing that an anthropologist is seeking certain species in certain geographical regions, the CPUs in KQPs 19 can list all the common weather patterns in the regions and indicate where else such patterns exist. As a second example, if a petrochemical engineer is exploring a polymer chain, KQP 19 can alert the chemist to where else such chains exist and all the supporting documentation. This functionality is most-easily achieved by storing the information in knowledge databases 15 as relational data structures. Whereas searches based upon byte-strings are commonly done in most databases, the searches that the NBES can perform are based upon the structure of knowledge queried and its relationships to the previous knowledge that has been sought.

Deadlocked (Self Contradictory) Pursuits:

When the pattern of interrogation is partly established by the researcher at a KQP 19, its CPUs can complete the linkage of information to provide all the answers sought. However, if the line of interrogation is futile (e.g., list all situations where energy has been created and not transformed), KQP 19 can provide alternate approaches to the problem and inform the user about fundamental laws of conservation of energy, if applicable.

The functions that NBES can perform are based upon the knowledge and its structure (via forward and backward chaining) rather than the retrieval of data, and it can become a much-more powerful teaching and service tool in most educational environments. It can also verify the logical inference that the student has drawn from the knowledge which he or she has gained from the interaction with the NBES. This is based upon the logic embedded in the knowledge that has been furnished to the student. Any miscommunication and misunderstanding that the student may have gained during the interaction with NBES is thus eliminated.

Unlike mass-media systems, the NBES system compiles and composes the information returned. It is knowledge-based and query-driven. It responds and monitors the progress of each transaction in the context of the capability of the network and the prior interrogation. It responds by detecting the English-language-like queries from campus and local area networks. The flow of information is always unidirectional throughout the network, and the duplex mode of data transmission may be completely eliminated. The channel capacities may thus be adjusted much more optimally in the various links of the network.

This network performs well as a high-level educator at graduate centers or as an artificially-intelligent knowledge bank for research laboratories. It responds routinely to the very first question, but immediately picks up the forward or the backward linkages of that particular information that has been transacted by the network. Alternatively, the network may be programmed to retain a knowledge profile of each student and answer according to the learning ability of the student. This enables the network to monitor and grade the learning process of the student like any university or school.

Function flow within the NBES

To make use of the NBES, a user at a terminal 11 establishes a connection via campus network 12, in a conventional manner, with that network's dialog processor 13, and logs in. Responding to the login, at step 200 of FIG. 2, dialog processor 13 validates the login, at step 204. For example, dialog processor 13 validates the user's I.D. and the terminal 11 from which the user is calling. If validation fails, as determined at step 288, dialog processor 13 logs off the user to break the connection, at step 212. If validation succeeds, at step 208, dialog processor 13 prompts the user for a request, i.e., a query, at step 216. The user responds by entering the query via terminal 11 using a suitable predetermined job-control language. The query has two parts: operand, i.e., identification of the subject matter to which the query pertains; and operator, i.e., identification of what the user wants done with respect to the subject matter.

Dialog processor 13 which resides within the local campus network 12 receives the query, at step 218, invokes a knowledge logic interpreter program 14, at step 232, and passes it the query. In response to the invocation, at step 234, knowledge logic interpreter 14, executing on dialog processor 13, parses the received query, at step 238, in the manner of a conventional compiler. If the parse fails, i.e., knowledge logic interpreter 14 cannot make sense of the query for some reason, as determined at step 242, knowledge logic interpreter 14 causes dialog processor 13 to inform the user and to request the user to reformulate the query, at step 260. If knowledge logic interpreter 14 understands the query, as determined at step 242, it accesses a dictionary 280 of subject matter contained by knowledge database 15 of the local campus network 12. Each dictionary entry 281 identifies a different subject 282 and includes a list of operators 283 that pertain to the subject. Operators 283 are functions that can be performed on subject 282, such as questions that can be asked with respect to that subject 282. Knowledge logic interface 14 checks the operand of the query against the dictionary's entries 281 to determine if the operand appears in dictionary 280, at step 246. If the operand does appear in dictionary 280, the query can be handled locally, and knowledge logic interpreter 14 checks whether the operator of the query appears in the list of operators 283 that pertain to the subject 282, at step 256. If the query's operator does not appear on that list, the query cannot be processed, and knowledge logic interpreter 14 causes dialog processor 13 to so inform the user, request the user to reformulate the query, and provide the list of operators 283 that can be performed on the subject 282 for the user to choose from, at step 260.

If it is determined at step 256 that the query's operator appears on the subject matter's operator 283 list, knowledge logic interface 14 compiles the query into an executable program in database language, comprising one or more instructions depending upon the complexity of the query, at step 268. Knowledge logic interpreter 14 then causes dialog processor 13 to send the executable program, along with information identifying the user who originated the query, to knowledge database 15 of the local campus network 12, at step 272.

Knowledge database 15 receives the program, at step 300 of FIG. 7, and executes it, at step 704. Execution of the program for example involves retrieving information that conforms to the operand(s) of the query and satisfies the operator(s) of the query. Knowledge database 15 then sends the results of execution of the program via campus network 12 to terminal 11 of the user, at step 708. Illustratively, the results are in the form of a data file whose contents can be displayed on a display of the user's terminal 11. If the user wishes to follow up on the original query, the user formulates a new query and again sends it to dialog processor 13.

Figure 2:
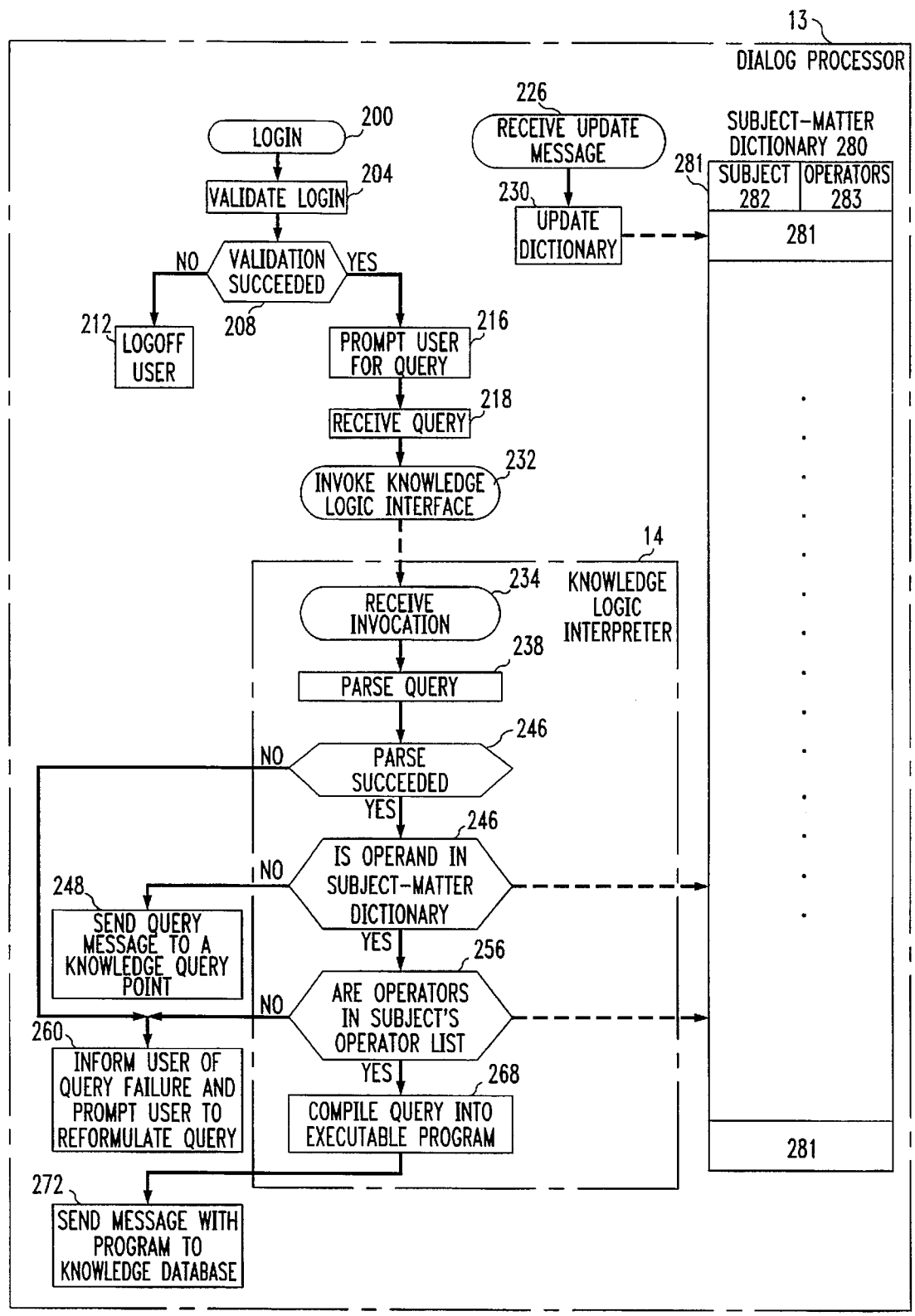
FIG. 2 is a functional flow diagram of a dialog processor of the network of FIG. 1.

Returning to step 246 of FIG. 2, if knowledge logic interpreter 14 does not find the query's operand in dictionary 280 of locally-available subject matter, the query cannot be satisfied locally within the local campus network 12, but must be satisfied elsewhere within the NBES. Knowledge logic interpreter 14 therefore causes dialog processor 13 to access public network 18 via a gateway 17, such as a PBX that connects campus network 12 to public network 18, and send the user's query and information identifying the user and campus network 12 via control links 24 of network 18, such as an ISDN D channel, to a gateway 20 of a knowledge ring 21 and therethrough to a knowledge query point 19, at step 248.

Figure 3:
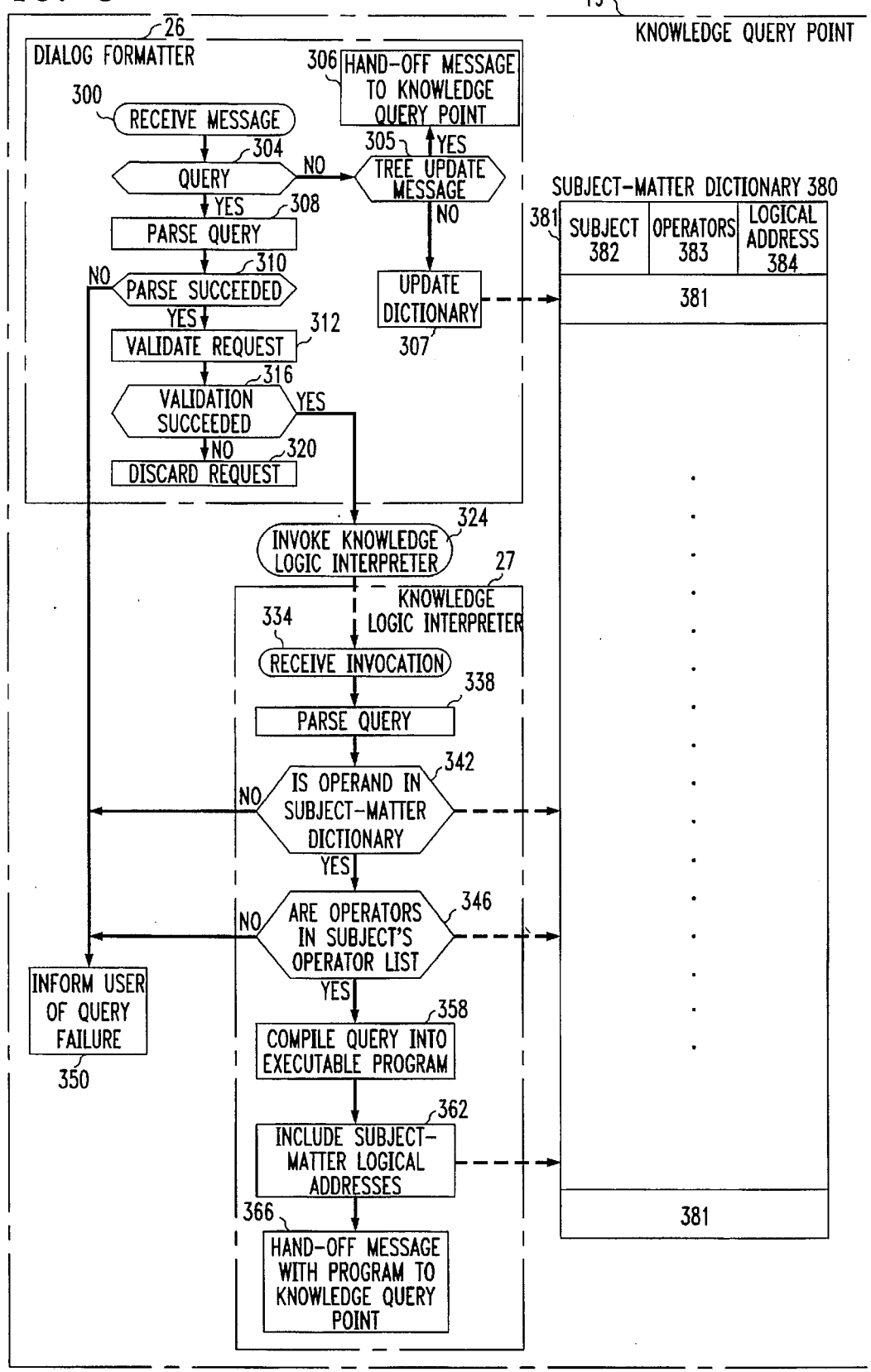
FIGS. 3 and 4 are a functional flow diagram of a knowledge query point of the network of FIG. 1.

A dialog formatter 26 and its knowledge logic interpreter 27 within KQP 19 essentially replicate the functions of dialog processor 13 and its knowledge logic interpreter 14. A message directed to KQP 19 is received by dialog formatter 26. In response to receiving the message, at step 300 of FIG. 3, dialog formatter 26 determines if it is a query message, at step 304, and if so, it parses the query, at step 308, in the manner of a conventional compiler. If the parse fails, i.e., dialog formatter 26 cannot make sense of the query for some reason, as determined at step 310, dialog formatter 26 causes knowledge query point 19 to notify the user, at step 350. If the parse succeeds, dialog formatter 26 validates the user and also the calling campus network 12, at step 312. If the validation is unsuccessful, as determined at step 316, dialog formatter 26 discards the query, at step 320. If the validation succeeds, at step 316, dialog formatter 26 causes knowledge query point 19 to invoke knowledge logic interpreter 27, at step 324.

In response to being invoked, at step 334, knowledge logic interpreter 27 again parses the query, at step 338, and checks the operand and operator of the query against a subject matter dictionary 380 of knowledge query point 19 whose entries 381 list all subject matter contained within the NBES, to determine if the operator is one of the subjects 382 listed in entries 381, at step 342, and to determine if the operands are among the operands 382 listed in entry 381 for that subject, at step 346. If either check fails, knowledge logic interpreter 27 causes knowledge query point 19 to notify the user of failure to find either the operand or the operator in dictionary 380, at step 350. If the checks of both steps 342 and 346 succeed, knowledge logic interpreter 27 compiles the query into an executable program, at step 358. In addition, dictionary 380 includes, for each entry 381, a logical address 384 that identifies the entry's subject 382 within a system of classification, such as the Dewey decimal system. Knowledge logic interpreter 27 includes this logical address 384, at step 362, and identification of the querying user, with the executable program in a query message, and hands off the query message to knowledge query point 19, at step 366.

Knowledge query points 19 together hold a knowledge tree structure that relates, chains, together all knowledge contained within all addressable databases 15. Together with subject matter dictionary 380, the knowledge tree represents a human-language (e.g., English) knowledge dictionary having knowledge classified according to a selected numbering hierarchy. Each knowledge query point 19 holds a different portion 450 of this tree along with information on which knowledge query points 19 hold which other portions of the tree. Through this chaining, which can be followed both forward and backward within the tree, a knowledge query point 19 can determine supplementary knowledge, complementary knowledge, analogical knowledge, and self-contradictory pursuits, with respect to a query. In this manner, consistent with the description of KQP 19 given above, a knowledge query point 19 can determine whether there is other information related to a query that could be of interest to the querying user.

Figure 4:
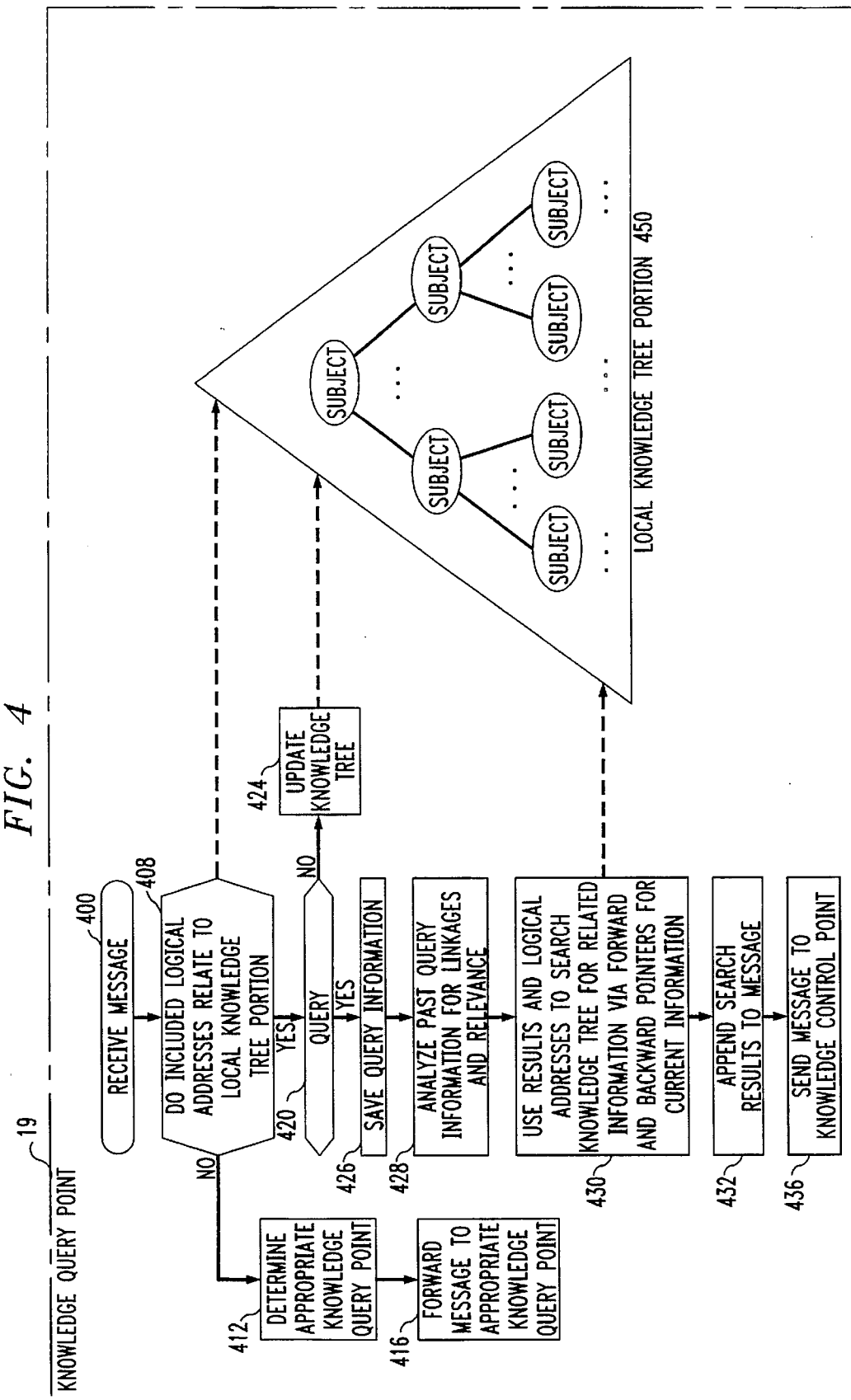

Upon receipt of a message, at step 400 of FIG. 4, the receiving one of the knowledge query points 19 first determines whether or not the subject matter logical addresses contained within the received message relate to portion 450 of the knowledge tree which it contains, at step 408. If not, the receiving knowledge query point 19 determines which other knowledge query point 19 holds the relevant portion 450 of the knowledge tree, at step 412, and forwards the message to that knowledge query point 19 via knowledge ring 21, at step 416. If it determines that the appropriate knowledge query point 19 is not in this NBES segment, it uses knowledge ring 21 to send the message to another NBES segment (not shown) via gateway 20 and through control links 24 of public network 18.

If the received message is determined at step 408 to relate to portion 450 of the knowledge tree contained by the receiving knowledge query point 19, the receiving knowledge query point 19 determines whether it is a query message, at step 420. If so, it saves information that defines the query along with any previously-saved query information, defining previous queries, of this user, at step 426. Knowledge query point 19 then analyzes the saved query information, using artificial intelligence to determine relevance of the past queries to the present query and to identify linkages, relationships, therebetween, at step 428. Knowledge query point 19 then uses the results of the analysis with the logical addresses contained within the message to search its portion 450 of the knowledge tree for other information related to the query, at step 430. The search in tree portion 450 is carried out using forward and backward pointers of the subject of the current query that tie it to the other subjects within tree portion 450, in the manner known to knowledge engineering. Knowledge query point 19 then appends results of the search to the query message's contents, at step 432. Illustratively, knowledge query point 19 appends the results either as additional executable instructions to the executable program, or merely as additional operands to the instructions that already exist in the program. In either case, the operands are accompanied by logical addresses that relate the operands to the system of knowledge classification, in the same manner as is done by a knowledge logic interpreter 27. Knowledge query point 19 then sends the supplemental query message to a knowledge control point 22 via knowledge ring 21, at step 436.

Knowledge control point 22 is an address translator. It contains a database-implemented translation table 550 whose entries 551 establish a correspondence between the abovementioned logical addresses 552 of subject matter and physical addresses 553 that actually indicate the location(s), i.e., the particular knowledge database(s) 15 and the file(s) within that(those) database(s) 15 where the corresponding information is actually stored. Upon receiving a message, at step 500 of FIG. 5, knowledge control point 22 checks whether it is a query message, at step 504, and if so, it performs the logical-to-physical address translation on the contents of the received message, at step 512. It then forwards the query message via knowledge ring 21 to a knowledge transfer point 23, at step 516.

Knowledge transfer point 23 is a request server. Upon receipt of the message, at step 600 of FIG. 6, it analyzes the physical addresses in the received message to determine if they all relate to the same knowledge database 15, at step 604. If not, knowledge transfer point 23 reformulates the message into a plurality of messages each carrying an executable program directed to a different one knowledge database 15, at step 608. Each message carries an indication that it is one of many. If necessary, as determined at step 612, knowledge transfer point 23 also translates each message's executable program into the peculiar (non-standard) language of the particular knowledge database 15 to which the message is directed, at step 616. Knowledge transfer point then sends each message to its destination knowledge database 15 via control links 24 of public network 18, at step 620.

Each destination knowledge database 15 receives its message, at step 700 of FIG. 7, and executes the program conveyed thereby, at step 704. Each knowledge database 15 then sends a message containing the results of the execution via VHSDN 25 of public network 18, gateway 17, and campus network 12 to terminal 11 of the user who made the request, at step 708. Each message carries an indication that it is a sole message or one of many to be received by the user. Again, illustratively, the results are in the form of a data file whose contents can be displayed on the display of the user's terminal 11. After the user has received all of the messages carrying responses from databases 15, if the user wishes to follow up on the original query, the user formulates a new query and again sends it to dialog processor 13 of its campus network 12.

Figure 8:
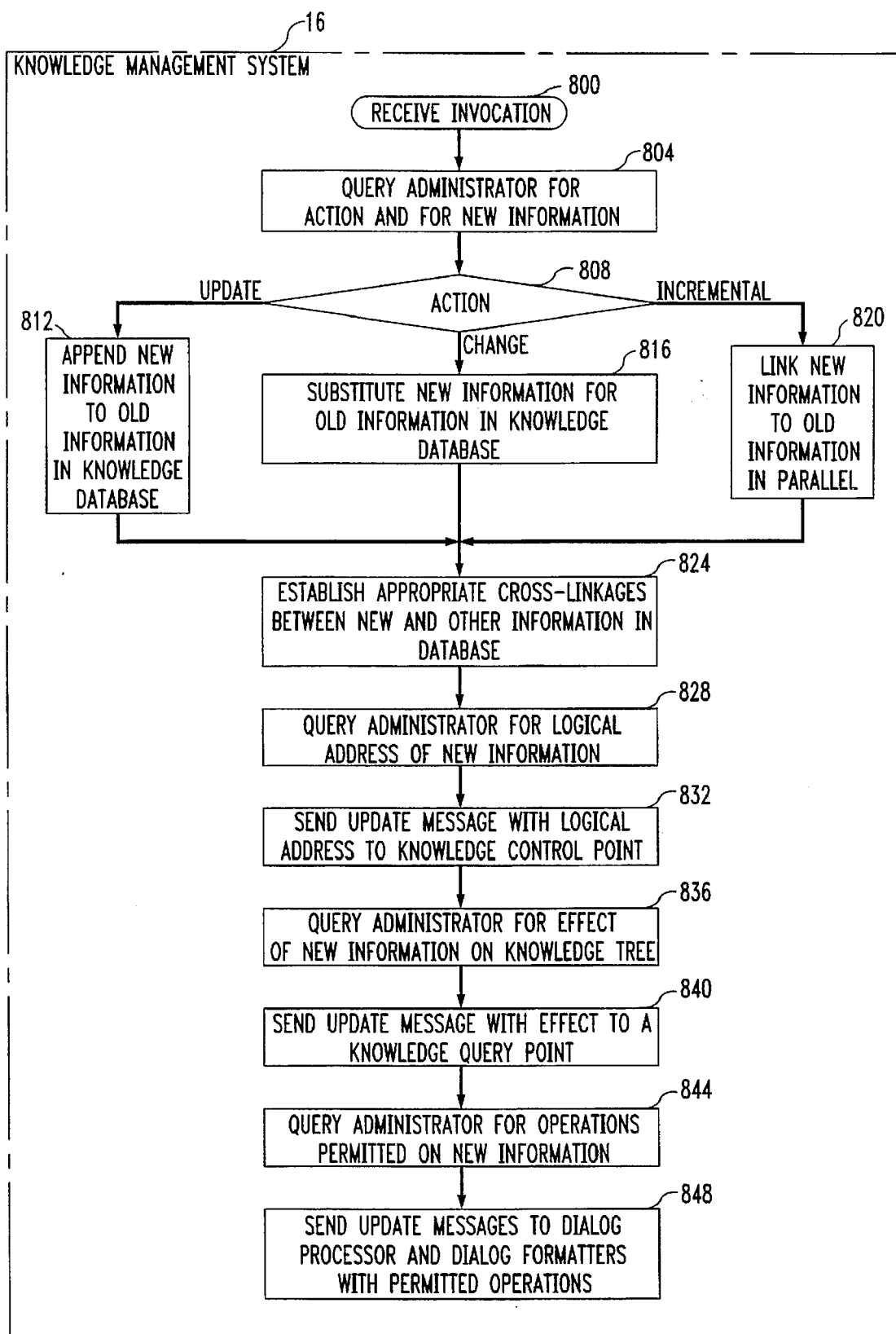
FIG. 8 is a functional flow diagram of a knowledge management system of the network of FIG. 1.

As new knowledge is generated and old knowledge changes, knowledge management systems 16 come into play. When new or changed information is to be entered into a knowledge database 15, that database's administrator invokes that database's knowledge management system 16, at step 800 of FIG. 8, which then queries the administrator, at step 804, regarding action to be taken: update, change, or provide incremental knowledge. Depending upon the response, determined at step 808, information entered by the administrator is appended to, substituted for, or linked in parallel to, existing information identified by the administrator, at steps 812, 816, and 820, respectively. Knowledge management system 16 establishes the appropriate linkages between the new and other information in the database by establishing pointers therebetween, in a conventional manner, at step 824.

Knowledge management system 16 then queries the administrator for the logical address, within the system of knowledge classification, of the newly-entered information, at step 828. Upon receipt of that logical address or addresses, system 16 sends an update message conveying this address, along with the identification of the local knowledge database 15 and files therein where the new information is stored, to knowledge control point 22, via control link 24 of the public network 18, at step 832. The message is relayed by gateway 20 to knowledge ring 21. Knowledge control point 22 receives the message, at step 500 of FIG. 5, determines that is an update message, at step 504, and uses its contents to update its translation table 550, at step 508.

Knowledge management system 16 then queries the administrator for a description of the effect of the new information on the knowledge tree, at step 836. Upon receipt of this description, it formulates an update message indicating this effect and sends it to a knowledge query point 19 via control links 24 of the public network 18, at step 840. The message is relayed by dialog processor 26 upon determining that this is a tree update message, at steps 300–306. A knowledge query point 19 receives the update message, at step 400, and determines if the contents relate to its part 450 of the knowledge tree, at step 408. If not, it determines the appropriate knowledge query point, at step 412, and passes the message on to that appropriate knowledge query point 19, at step 416. When a knowledge query point 19 receives the message, at step 400, and determines that it is the appropriate knowledge query point 19, at step 408, and further determines that this is an update message, at step 420, it uses the contents of the update message to update its portion 450 of the knowledge tree, at step 424.

The knowledge management system 16 further queries the administrator for operations that can be performed on the newly-provided information, at step 844. Upon receipt of a response from the administrator, it sends an update message identifying the subject and the operations to dialog processor 13 of its campus network 12 and to dialog formatters 26 of knowledge query points 19, at step 848. The local dialog processor 13 receives the update message, at step 226 of FIG. 2, and uses its contents to update the contents of its subject matter dictionary 280, at step 230. Similarly, each dialog formatter 26 receives the message, at step 300 of FIG. 3, determines that is a dictionary update message, at steps 304 and 305, and uses contents of the message to update the contents of its subject matter directory 380, at step 307.

Of course, it should be understood that various changes and modifications to the illustrative embodiment described above will be apparent to those skilled in the art. For example, this invention and its principles need not be limited in its application to knowledge databases, but may be applied to any repositories of any kind of subjects, such as warehouses, fuel storage and distribution facilities, organ banks, stock markets, social services providers, etc., for purposes such as placing orders, taking inventory, requesting retrieval, shipment, or restocking, determining status, etc. The aspects of the invention concerning related subjects also find use in these applications. For example, complementary subjects may be widgets that are commonly used or sold together, analogical subjects may be substitute parts or fuels, supplementary subjects may be widgets and the tools needed to install them, inductive knowledge may concern organs from compatible but different-sex or different-race donors than the intended recipient, etc. Such changes and modifications can be made without departing from the spirit and the scope of the invention and without diminishing its attendant advantages. It is therefore intended that all such changes and modifications be covered by the following claims.

We claim:

1. An automated method of responding to a query in an intelligent communications network, comprising the steps of:

in response to receiving in the intelligent communications network a query from a requester, parsing the query to identify a subject of the query and to identify an operation of the query to be performed with respect to the subject;

determining, from a subject dictionary that lists subjects that are available in the network, their logical addresses, and operations permitted in the network to be performed with respect to the available subjects, whether the identified subject is available in the network and whether the identified operation is permitted to be performed with respect to the identified subject;

in response to a determination that the identified subject is available and the identified operation is permitted, compiling the query into an executable program including the logical address of the identified subject;

translating the logical address in the program into a physical address of the identified subject;

using the physical address in the program to select a subject repository that contains the identified subject;

transmitting the program to the selected repository for execution;

executing the program at the selected repository to obtain a response to the query; and transmitting the obtained response to the requester; wherein the method further comprises the steps of using the logical address of the identified subject to find a subject related to the identified subject, in a knowledge tree that defines relationships between the available subjects, and supplementing the program with the related subject and its logical address; wherein the step of translating comprises the step of translating the logical addresses of the identified and the related subjects in the program into physical addresses of the identified and the related subjects, the step of using physical address comprises the step of using the physical addresses in the program to select at least one repository that contains the identified and the related subjects, the step of sending comprises the step of sending the .program to the selected at least one repository for execution, the step of executing comprises the step of executing the program at the selected at least one repository to obtain at least one response to the query, and the step of transmitting comprises the step of transmitting the at least one response to the requester.

2. The method of claim 1 in a network having a plurality of nodes each holding a different portion of the knowledge tree, wherein the step of using comprises the steps of determining at one of the nodes whether the logical address included in the executable program relates to the portion of the knowledge tree held by the one node;

in response to determining at the one node that the included logical address relates to the held portion of the knowledge tree, using the logical address of the identified subject at the one node to find the subject related to the identified subject in the portion of the knowledge tree held by the one node;

in response to determining at the one node that the included logical address does not relate to the held portion of the knowledge tree, determining at the one node which other node holds a portion of the knowledge tree to which the included logical address relates; and transmitting the executable program to the determined other node to find the related subject.

3. The method of claim 1 wherein the related subject comprises at least one of supplementary knowledge, complementary knowledge, inductive knowledge, and analogical knowledge.

4. The method of claim 1 wherein:

subjects comprise subjects of knowledge and repositories comprise knowledge databases.

5. The method of claim 1 in an intelligent communications network wherein:

the subject of the query is knowledge; and the subject dictionary and the knowledge tree together represent a human language knowledge dictionary having knowledge classified according to a numbering hierarchy.

6. The method of claim 1 wherein:

the subject of the query is knowledge; and the steps of parsing and compiling together include the step of breaking down a high-level language query by computer into one or more operator codes that operate on knowledge and operand codes that represent knowledge.

7. The method of claim 1 in an information network that comprises a plurality of localized networks and a second network interconnecting the plurality of localized networks, wherein:

the step of parsing comprises the step of in response to receiving in an individual localized network a query from a requester, parsing the query in the individual localized network to identify a subject of the query and an operation to be performed with respect to the subject;

the step of determining comprises the step of determining in the individual localized network, from a subject-matter dictionary that lists subjects that are available in the individual localized network and operations permitted in the individual localized network with respect to the available subjects, whether the identified subject is available in the individual localized network and whether the identified operation is permitted in the individual localized network with respect to the identified subject;

the step of compiling comprises the steps of in response to a determination in the individual localized network that the identified subject matter is available in the individual localized network and the identified operation is permitted in the individual localized network, compiling the query in the individual localized network into a locally-executable program, and in response to a determination that the identified subject matter is not available in the individual localized network, transmitting the query to the second network;

the step of transmitting the program comprises the step of transmitting the locally-executable program to a repository in the individual localized network;

the step of executing comprises the step of executing the locally-executable program at a repository in the individual localized network to obtain a response to the query; and the step of transmitting the response comprises the step of transmitting the response obtained at the repository in the individual localized network to the requester;

the step of parsing comprises the further step of in response to receiving in the second network the query from the individual localized network, parsing the query in the second network to identify the subject of the query and the operation to be performed with respect to the subject;

the step of determining comprises the further step of determining in the second network, from a subject-matter dictionary that lists subjects that are available in the localized networks and in the second network, their logical addresses, and operations permitted in the networks with respect to the available subjects, whether the identified subject is available in one of the localized networks or in the second network and whether the identified operation is permitted with respect to the identified subject;

the step of compiling comprises the further step of in response to a determination in the second network that the identified subject is available and the identified operation is permitted, compiling the query in the second network into an executable program including the logical address of the identified subject;

the step of translating comprises the step of translating in the second network the logical address in the program into a physical address of the identified subject;

the step of using comprises the step of using in the second network the physical address in the program to select a repository in the information network that contains the identified subject;

the step of transmitting the program comprises the further step of transmitting the program for execution to the repository selected in the second network;

the step of executing comprises the further step of executing the program in the repository selected in the second network to obtain a response to the query; and the step of transmitting the response comprises the further step of transmitting the response obtained at the repository selected in the second network to the requester.

8. An intelligent communications network comprising:

means responsive to receipt of a query from a requester, for parsing the query to identify a subject of the query and to identify an operation in the query to be performed with respect to the subject;

a subject dictionary that lists subjects that are available in the network, their logical addresses, and operations permitted in the network to be performed with respect to the available subjects;

means cooperative with the parsing means and the dictionary for determining from the dictionary whether the identified subject is available in the network and whether the identified operation is permitted to be performed with respect to the identified subject;

means cooperative with the determining means and responsive to a determination that the identified subject is available and the identified operation is permitted, for compiling the query into an executable program including the logical address of the identified subject;

means cooperative with the compiling means, for translating the logical address in the program into a physical address of the identified subject;

a plurality of subject repositories;

means cooperative with the translating means, for selecting, on the basis of the physical address in the program, a repository that contains the identified subject;

means cooperative with the selecting means and the repositories, for transporting the program to the selected repository for execution;

means in the selected repository cooperative with the transporting means, for executing the program to obtain a response to the query from the selected database; and means cooperative with the executing means, for transmitting the obtained response to the requester; wherein the intelligent communications network further comprises:

a knowledge tree that defines relationships between the available subjects;

means cooperative with the compiling means and the knowledge tree, for finding, on the basis of the logical address of the identified subject, a subject related in the knowledge tree to the identified subject and for supplementing the program with the related subject and its logical address; wherein the translating means comprise means for translating the logical addresses of the identified and the related subjects in the program into physical addresses of the identified and the related subjects;

the means for selecting a repository comprise means for selecting, on the basis of the physical addresses in the program, at least one repository that contains the identified and the related subjects;

the means for transporting the program comprise means for transporting the program to the selected at least one repository for execution;

the executing means comprise an individual means in each repository of the at least one repository for executing the program to obtain at least one response to the query; and the response transmitting means comprise means for transmitting the at least one response to the requester.

9. The intelligent communications network of claim 8 further comprising:

a plurality of nodes each holding a different portion of the knowledge tree; wherein the finding means comprise means in one of the nodes responsive to the executable program including the logical address for determining whether the logical address relates to the portion of the knowledge tree held by the one node, means in the one node cooperative with the determining means of the one node, responsive to a determination that the included logical address relates to the held portion of the knowledge tree, for finding, on the basis of the logical address, a subject related in the knowledge tree to the identified subject and for supplementing the program with the related subject and its logical address, means in the one node cooperative with the determining means of the one node, responsive to a determination that the included logical address does not relate to the held portion of the knowledge tree, for determining which other node holds a portion of the knowledge tree to which the logical address relates, and transmitting the executable program to the determined other node; and means in the other node responsive to receipt of the transmitted executable program for finding, on the basis of the logical address, a subject related in the knowledge tree to the identified subject and for supplementing the program with the related subject and its logical address.

10. The intelligent communications network of claim 8 wherein the related subject comprises at least one of supplementary knowledge, complementary knowledge, inductive knowledge, and analogical knowledge.

11. The intelligent communications network of claim 8 wherein:

subjects comprise subjects of knowledge and repositories comprise knowledge databases.

12. The intelligent communications network of claim 8 wherein:

the subject of the query is knowledge; and the subject dictionary and the knowledge tree together represent a human language knowledge dictionary having knowledge classified according to a numbering hierarchy.

13. The intelligent communications network of claim 8 wherein:

the subject of the query is knowledge; and the parsing means and the compiling means together include computer means for breaking down a high-level language query into one or more operator codes that operate on knowledge and operand codes that represent knowledge.

14. An intelligent communications network comprising:

a plurality of localized networks;

a second network interconnecting the plurality of localized networks;

means in an individual localized network responsive to receipt of a query from a requester, for parsing the query to identify a subject of the query and to identify an operation in the query to be performed with respect to the subject;

a subject dictionary in the individual localized network that lists subjects that are available in the individual localized network and operations permitted to be performed in the individual localized network with respect to the available subjects;

means in the individual localized network cooperative with the parsing means and the subject dictionary, for determining whether the identified subject is available in the individual localized network and whether the identified operation is permitted to be performed in the individual localized network with respect to the identified subject;

means in the individual localized network cooperative with the determining means and responsive to a determination that the identified subject is available in the individual localized network and the identified operation is permitted in the individual localized network, for compiling the query into a locally-executable program;

means in the individual localized network cooperative with the determining means and responsive to a determination that the identified subject is not available in the individual localized network, for transmitting the query to a second network;

a knowledge database in the individual localized network, including means cooperative with the compiling means in the individual localized network, for executing the program to obtain a response to the query from the knowledge database in the individual localized network;

means in the individual localized network cooperative with the executing means for transmitting the response obtained at the knowledge database in the individual localized network to the requester;

means in the second network responsive to receipt of the query from the individual localized network, for parsing the query to identify a subject of the query and an operation to be performed with respect to the subject;

a subject dictionary in the second network that lists subjects that are available in the localized networks and in the second network, their logical addresses, and operations permitted in the networks with respect to the available subjects;

means in the second network cooperative with the parsing means and the subject dictionary in the second network, for determining whether the identified subject is available in one of the localized networks or the second network and whether the identified operation is permitted with respect to the identified subject;

means in the second network cooperative with the determining means in the second network and responsive to a determination that the identified subject is available in one of the localized networks or the second network and the identified operation is permitted with respect to the identified subject, for compiling the query into an executable program including the logical address of the identified subject;

means in the second network cooperative with the compiling means in the second network, for translating the logical address in the program into a physical address of the identified subject;

a plurality of subject repositories in the second network;

means in the second network cooperative with the translating means, for selecting, on the basis of the physical address in the program, a repository that contains the identified subjects;

means in the second network cooperative with the selecting means and repositories, for transporting the programs to the selected repository for execution;

means in the selected repository cooperative with the transporting means, for executing the program to obtain a response to the query from the selected repository; and means cooperative with the executing means, for transmitting the obtained response to the requester; wherein the intelligent communications network further comprises:

a knowledge tree in the second network that defines relationships between the available subjects;

means in the second network cooperative with the compiling means and the knowledge tree, for finding, on the basis of the logical address of the identified subject, a subject related in the knowledge tree to the identified subject and for supplementing the program with the related and its logical address; wherein the translating means in the second network comprise means for translating the logical addresses of the identified and the related subjects in the program into physical addresses of the identified and the related subjects;

the means in the second network for selecting a repository comprise means for selecting, on the basis of the physical addresses in the program, at least one repository that contains the identified and the related subjects;

the means in the second network for transporting the program comprise means for transporting the program to the selected at least one repository for execution;

the executing means in the second network comprise an individual means in each repository of the at least one repository for executing the program to obtain at least one response to the query; and the response transmitting means in the second network comprise means for transmitting the at least one response to the requester.

* * * * *